United States Patent
Schmid et al.

(10) Patent No.: US 6,460,465 B1
(45) Date of Patent: Oct. 8, 2002

(54) IGNITION DEVICE FOR TRIGGERING A RESTRAINING DEVICE

(75) Inventors: Martin Schmid, Frastanz; Helmut Fabing, Rankweil, both of (AT)

(73) Assignee: Hirschmann Austria GmbH, Rankweil (AU)

( * ) Notice: Subject to any disclaimer, the term of this patent is extended or adjusted under 35 U.S.C. 154(b) by 0 days.

(21) Appl. No.: 09/715,938

(22) Filed: Nov. 17, 2000

(30) Foreign Application Priority Data

Nov. 22, 1999 (AT) ............................................. 1977/99

(51) Int. Cl.⁷ ................................. C06D 5/00; F42C 3/10
(52) U.S. Cl. .................... 102/530; 102/531; 102/202.5; 102/202.7; 102/202.9; 102/200
(58) Field of Search ........................... 102/202.9, 202.7, 102/530, 531, 202.5, 200

(56) References Cited

U.S. PATENT DOCUMENTS

| | | | |
|---|---|---|---|
| 4,110,813 A | * | 8/1978 | Hoheisel et al. ......... 102/202.9 |
| 5,269,560 A | * | 12/1993 | O'Loughlin et al. ........ 102/531 |
| 5,429,386 A | | 7/1995 | Mihm |
| 5,433,147 A | * | 7/1995 | Brede et al. ................ 102/530 |
| 5,468,017 A | | 11/1995 | Kirsch et al. |
| 5,556,132 A | | 9/1996 | Sampson |
| 6,073,963 A | * | 6/2000 | Hamilton et al. ........... 102/531 |
| 6,126,197 A | * | 10/2000 | Muir et al. |
| 6,129,560 A | * | 10/2000 | Baur et al. |
| 6,166,452 A | * | 12/2000 | Adams et al. |
| 6,203,342 B1 | * | 3/2001 | Gauker et al. |
| 6,227,115 B1 | * | 5/2001 | Gruber et al. .............. 102/530 |
| 6,257,617 B1 | * | 7/2001 | McFarland et al. |
| 6,276,953 B1 | * | 8/2001 | Gauker et al. |

FOREIGN PATENT DOCUMENTS

| | | |
|---|---|---|
| AT | 000522 | 12/1995 |
| DE | 195 31 666 A1 | 3/1997 |
| DE | 196 10 799 C1 | 9/1997 |
| DE | 198 56 328 A1 * | 6/2000 ................. 102/530 |

OTHER PUBLICATIONS

Third International Congress "Molded Interconnect Devices", Sep. 23–24, 1998, Erlangen, Germany (ISBN 3–87525–111–3).

* cited by examiner

Primary Examiner—Michael J. Carone
Assistant Examiner—Lulit Semunegus
(74) Attorney, Agent, or Firm—Friedrich Kueffner

(57) ABSTRACT

An ignition device for triggering a restraining device of a motor vehicle has an ignition device member having a forward end and a rearward end and having an insulated exterior with an exterior surface. An ignitor is arranged at the forward end of the ignition device member. An energy transfer device extends from the rearward end of the ignition device member to the ignitor and is configured to trigger the ignitor when the rearward end is exposed to heat. The energy transfer device is arranged within an interior of the ignition device member and is located in the area of the rearward end in close proximity to the exterior surface of the ignition device member.

19 Claims, 3 Drawing Sheets

IGNITION DEVICE FOR TRIGGERING A RESTRAINING DEVICE

BACKGROUND OF THE INVENTION

1. Field of the Invention

The invention relates to an ignition device in a motor vehicle for triggering a restraining device, in particular, a seat belt tightening device or airbags, wherein the ignition device comprises an ignition device housing or an ignition device body, an ignitor arranged in the area of the forward end of the ignition device, such as an ignition cap or an ignition resistor arranged in a powder chamber filled with a powder, as well as an energy transmitting device which extends from the rearward area of the ignition device opposite the ignitor to the ignitor and with which the ignitor can be triggered when heating occurs at the rearward area of the ignition device, especially in the case of a fire.

2. Description of the Related Art

An ignition device for triggering a restraining device is, for example, known from German patent DE 196 10 799 C1. In this ignition device, a support is provided with which ignition connector pins for receiving an ignition element are connected and which is furnished with electronic components such as an integrated circuit. The support can be formed as an MID support (MID=molded interconnect device). Such a support is, for example, formed by two different plastic material components which are connected to one another in a two-step injection molding process. The surface of one of the two plastic material components is metallized by an electro-chemical electroplating process while the surface of the other component does not accept such a metallization. By means of a corresponding embodiment of the arrangement of the two plastic material components, strip conductors for electronic components to be connected in an additional step can be provided by means of such a metallization by electroplating.

Other methods for manufacturing MID supports are also known, for example, so-called photo imaging technologies or film technologies. These technologies are, for example, described in the proceedings of the Third International Congress "Molded Interconnect Devices", Sep. 23–24, 1998, Erlangen, Germany (ISBN 3-87525-111-3). In each case, strip conductors are arranged on the injection-molded base body.

In AT 000 522 U1 an ignition device of the aforementioned kind mounted in a drive device of a restraining device is disclosed. The ignition device comprises an ignition cap which is mounted within a gas generator, i.e., extends into a chamber of the drive device which is filled with a propellant charge. For preventing ignition misfires, the ignition device has electronic components, in particular, inductive resistors. These components are relatively robust components in contrast to the more sensitive semiconductor components as, for example, integrated circuits.

Moreover, from U.S. Pat. No. 5,556,132 an ignition device of the aforementioned kind is known in which a device is provided by which, in the case of fire, it is ensured that, in the case of heating of the ignition device at its rearward area facing away from the ignitor, the ignitor is triggered before the housing becomes instable by heating. Otherwise, an uncontrolled triggering of the ignitor would be the result possibly causing parts of the now instable housing to be thrown off. This device comprises a pin which projects from the backside of the housing and extends through the housing to a chamber filled with a propellant charge in the area of the forward end of the ignition device. Across a portion of its length, the pin, beginning at the chamber filled with the propellant charge, is provided with a bore in which an auto ignition powder is provided. By heat transfer from the part of the pin projecting from the housing onto the auto ignition powder, the powder is ignited when its ignition temperature is surpassed so that the ignition device is triggered. A disadvantage of this ignition device is, in particular, the conductive connection of the pin into the powder chamber. This can carry the risk of a possible current flow through the pin and spark generation in the area of the propellant charge so that an impermissible triggering of the ignition device can occur. For example, such a current flow can be generated by electrostatic discharge or also in that the end of the pin projecting from the housing comes into contact with a voltage, for example, in the situation where the car body is subjected to a voltage during the course of repair work.

From German patent application DE 195 31 666 A1 a gas generator with an auto ignition device is also known for a heat exposure situation. A container is provided which is arranged in the powder chamber of the gas generator and is filled with an auto ignition powder. It is in a tight thermal surface contact with the upper part of the gas generator housing as well as with the oppositely positioned lower part of the gas generator housing. The ignition device of this gas generator is of a conventional configuration.

A further gas generator with an auto ignition device is known from U.S. Pat. No. 5,468,017. In this gas generator, the auto ignition powder is arranged in the area of the rearward wall of the gas generator housing. The ignition device of the gas generator is again of a conventional construction.

Moreover, from U.S. Pat. No. 5,429,386, a relatively complicated mechanical ignition device for the scenario of impermissibly high temperatures is described.

SUMMARY OF THE INVENTION

It is an object of the present invention to provided an improved ignition device of the aforementioned kind which, while having a relatively simple configuration, provides a high safety in a fire situation, on the one hand, and is at the same time insensitive with respect to electrostatic discharges or impermissible voltages on the car body, on the other hand.

In accordance with the present invention, this is achieved in that an energy transfer device is arranged in the interior of the ignition device member in the form of an ignition device housing or ignition device body (no separate housing), which has an insulated exterior, wherein the energy transfer device extends closely, preferably closer than 1 mm, to the external surface of the ignition device member (ignition device housing or ignition device body) at least in the area of the backside of the ignition device.

When the backside of the ignition device is heated during a fire situation, after melting of a thin coating which covers the rearward area of the energy transfer device, energy is transmitted from the energy transfer device to the ignitor. This results in triggering of the ignition device in a timely fashion before the ignition device housing or ignition device body can become instable.

An energy transfer device could be realized by a heat conducting element or, for example, also by a pyrotechnical device which extends from the rearward area of the ignition device to the ignitor and can be, for example, a match cable or a hollow space filled with a pyrotechnical material.

In an advantageous embodiment of the invention, the ignition device has an MID support for the electronic components which is provided with metallized strip conductors for connecting electronic components, wherein the heat conducting device comprises at least one metallized area of the MID support or is formed by at least one metallized area of the MID support.

DESCRIPTION OF THE PREFERRED EMBODIMENTS

Figure 1:
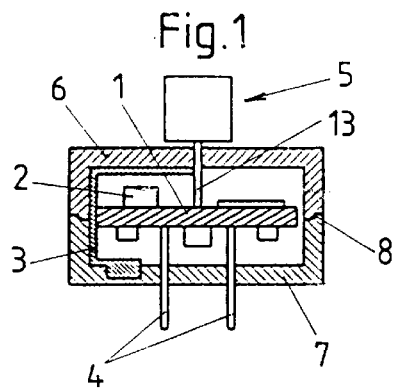
FIG. 1 is a schematic longitudinal section of a first embodiment of the ignition device according to the invention.

The ignition device illustrated in FIG. 1 has a plastic housing with a shell-shaped front housing part 6 and a shell-shaped rear housing part 7 which are connected to one another by a welding seam 8. In the interior of the housing a board 1 as a support for electronic components is provided wherein one of the components is indicated by reference numeral 2. Furthermore, connector pins 4 are arranged on the board and correspondingly electrically contacted with the components 2. The connector pins 4 project from the backside of the housing part 7 and are provided for electrically contacting the ignition device. The electronic components 2 comprise preferably an electronic bus device employing integrated circuits. By means of the connector pins not only the energy supply of the ignition device can be realized, but it is also possible to transmit control signals for triggering the ignition device which signals are to be processed by the electronic bus device.

Moreover, the connecting wires 13 of an ignition cap 5 are connected with the board 1 via the strip conductors arranged thereat. They project from the front side of the housing from the front housing part 6 and support the head of the ignition cap 5 arranged externally to the housing. When the ignition device is mounted within a drive device of a restraining device of a motor vehicle, the head of the ignition cap 5 projects into a chamber filled with a propellant charge which can be triggered by igniting the ignition cap 5.

In the interior of the housing a heat conducting device 3 in the form of a metallic pin is provided which extends from the rearward area of the ignition device along the inner side of the housing to the connecting wire 13 of the ignition cap and is in contact with it. In the area of its rearward end the pin, which forms the heat conducting device 3, has a thick area which preferably extends about a larger part of the depth of the housing (perpendicularly to the section plane of FIG. 1). In this area of the rearward end of the heat conducting device 3 the housing part 7 has a reduced wall thickness, and the heat conducting device 3 extends to a location closely adjacent to the exterior side of the housing part 7. The remaining thickness of the plastic layer between the rearward end of the heat conducting device and the exterior side of the housing is preferably less than 1 mm. It is also conceivable and possible that the heat conducting device extends with its rearward area about the connector pins 4 and to the side of the housing illustrated to the right in FIG. 1.

If in a fire situation, for example, in the case of an accident during the transport of the ignition device, first the backside of the housing is heated, it melts first at the surface until the layer covering the rearward area of the heat conducting device is melted away. As a consequence, the high temperature present at the backside of the housing is transmitted via the heat conducting device 3 to the connecting wire 13 of the ignition cap and farther to the head of the ignition cap so that the ignition cap is ignited before the housing has become so instable at the backside as a result of the heat that upon the ignition of the ignition cap 5 it would break apart and parts of it could be thrown off.

Figure 2:
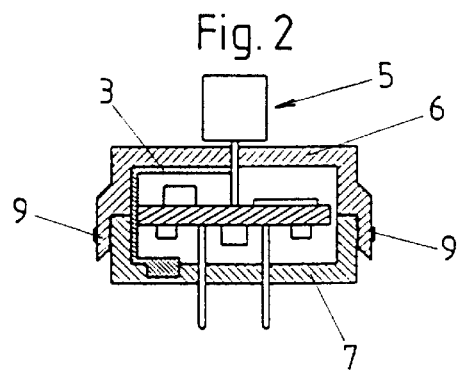
FIG. 2 is a schematic longitudinal section of a second embodiment of the ignition device according to the invention.

The embodiment illustrated in FIG. 2 corresponds to that in FIG. 1 wherein the two housing parts 6 and 7 are snap-connected by a snap connection which comprises spring-elastic tongues 9.

Figure 3:
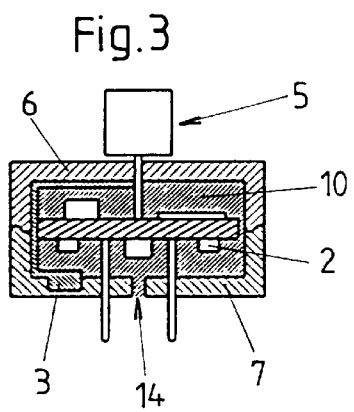
FIG. 3 is a schematic longitudinal section of a third embodiment of the ignition device according to the invention.

The embodiment illustrated in FIG. 3 corresponds again to the embodiment of FIG. 1 wherein via a fill opening 14 a sealing compound 10 is introduced into the housing which protects the electronic components 2 and increases the mechanical stability of the ignition device.

Figure 4:
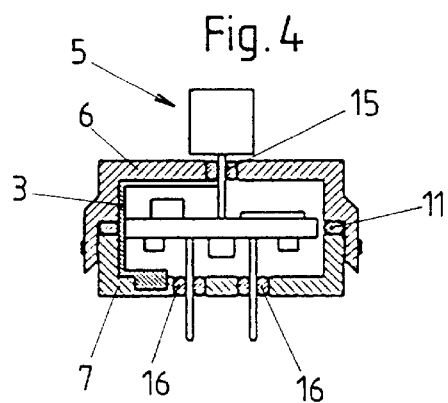
FIG. 4 is a schematic longitudinal section of a fourth embodiment of the ignition device according to the invention.

The embodiment according to FIG. 4 has, in addition to what is shown in FIG. 2, a seal 11 arranged between the front housing part 6 and the rear housing part 7, seals 15 arranged between the connecting wires 13 of the ignition cap 5 and the front housing part 6, as well as seals 16 between the connecting pins 4 of the ignition device and the rear housing part 7. These seals 11, 15, 16 are provided as protection of the electronic components relative to the penetration of moisture.

Figure 5:
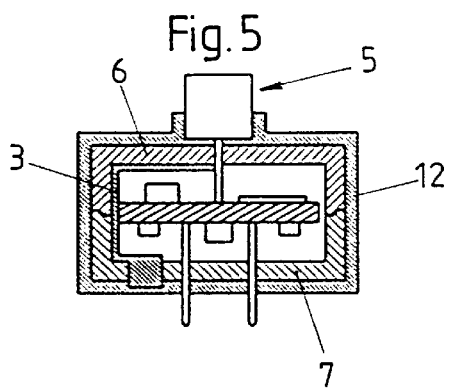
FIG. 5 is a schematic longitudinal section of a fifth embodiment of the ignition device according to the invention.

In the embodiment illustrated in FIG. 5, in addition to what is shown in the embodiment of FIG. 1, the housing comprised of the front housing part 6 and the rear housing part 7 is provided with an injection-molded casing 12 which surrounds the rear part of the head of the ignition cap 5. The rearward area of the heat conducting device 3 in this embodiment penetrates through the rear housing part 7 and projects slightly past it so that it is covered only by a thin layer, preferably thinner than 1 mm, of the injection-molded casing 12. In a fire situation, after melting of this thin layer covering the rearward area of the heat conducting device, the high temperature present thereat is again transmitted to the connecting wires 13 and, as a consequence, is transmitted to the head of the ignition cap 5. The injection-molded casing 12 serves again, in particular, as a protection with respect to the penetration of moisture and also as a means for increasing mechanical stability.

Figure 6:
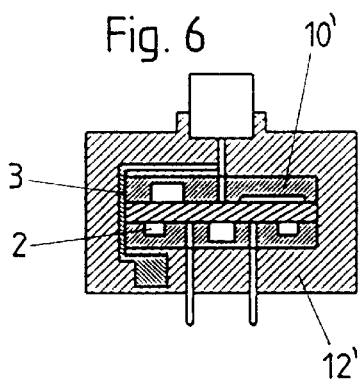
FIG. 6 is a schematic longitudinal section of a sixth embodiment of the ignition device according to the invention.

In embodiment according to FIG. 6, the board 1 is embedded together with electronic components 2 in a sealing compound 10'. This sealing compound is subsequently enclosed in an injection-molded casing 12' which forms a housing and in which, moreover, the heat conducting device 3 is embedded which extends again into close proximity to the rearward exterior surface of this housing.

Figure 7:
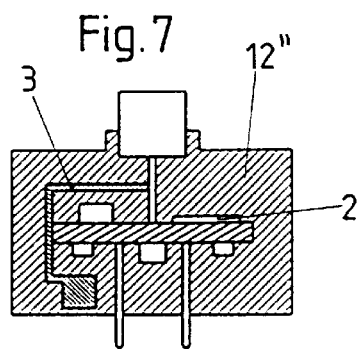
FIG. 7 is a schematic longitudinal section of a seventh embodiment of the ignition device according to the invention.

When the mechanical and/or thermal stability of the electronic components 2 allows this, the sealing compound can also be eliminated and the board 1 can be enclosed directly together with the electronic components 2 in an injection-molded casing 12" in which, again, a heat conducting device 3 in the form of a metallic pin is also embedded (compare FIG. 7). For protecting the electronic components 2 a so-called low-pressure injection molding process can be used.

Figure 8:
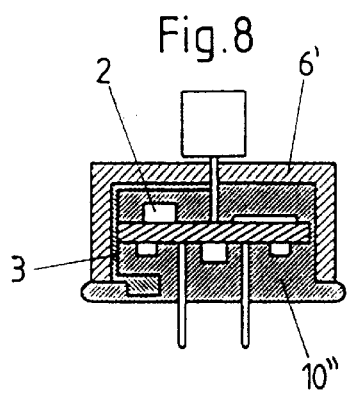
FIG. 8 is a schematic longitudinal section of an eighth embodiment of the ignition device according to the invention.

In the embodiment according to FIG. 8, a shell-shaped front housing part 6' is provided whose sidewalls extend laterally past the board and the electronic components 2 arranged thereon. The front housing part 6' is filled with a sealing compound 10" wherein a heat conducting device 3 embedded in the sealing compound extends into close proximity to the rearward exterior surface of the sealing compound 10".

Instead of a board it is also possible to employ other circuit supports, for example, a ceramic support, also called hybrid, or a stamped grid structure. Instead of the heat conducting element in the form of a metal pin, it is also possible to provide a heat conducting element which is formed by a heat-conducting plastic part.

In the embodiments illustrated in FIGS. 9 to 18, the ignition device is produced by using an MID support. During the manufacture of such a support, a second component is injection molded, for example, by means of a two-step injection molding process onto a base body of a first plastic component wherein one of these two plastic material components can be provided by means of an electro-chemical electroplating process with a metallization (metal coating). A series of such electroplated or metallized areas, identified by reference numeral 18, can be seen in the Figures and are separated from one another by insulating areas 19. The metallized areas 18 form, in particular, strip conductors which contact the electronic components 2 and connect them to one another. Therebetween insulating areas 19 are provided which are formed by the surface of the electro-plated metallized plastic component.

Figure 9:
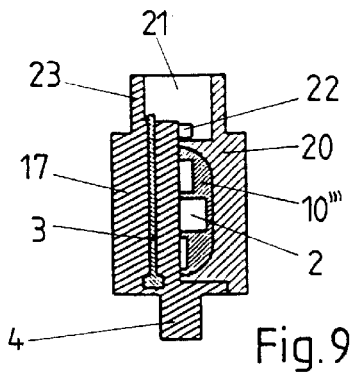
FIG. 9. is a schematic longitudinal section of a ninth embodiment of the ignition device according to the invention comprising an MID support.

The embodiment illustrated in FIG. 9 shows the components 2 arranged on the MID support embedded in a sealing compound 10'''. Subsequently, for completing the ignition device a further plastic material component 20 is applied by injection molding. The MID support has at its front side a projection 23 which forms a portion of the wall of a powder chamber 21. In this powder chamber 21 an ignition resistor 22 in the form of a resistor wire is arranged on the MID support via which the powder introduced into the powder chamber 21 can be ignited. After introduction of the powder (not illustrated in the Figures) into the powder chamber 21, it is closed at the front side by a membrane. Moreover, in the MID support a heat conducting device 3 in the form of a metal pin is arranged. Its front end extends into the powder chamber and its rearward end extends into the proximity of the rearward end of the MID support. At the rearward end of the MID support connector pins 4 are provided which are formed as a unitary part of the MID support and are provided with metallized areas. They are connected correspondingly by strip conductors formed by the metallized areas of the MID support with electronic components 2. Moreover, it is also conceivable and possible to employee separate, for example, pressed-in or soldered, connector pins instead of the connector pins formed as unitary parts of the MID supports.

Figure 10:
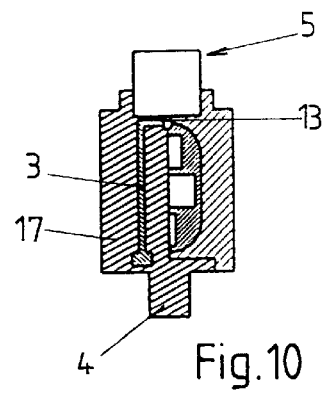
FIG. 10 is a schematic longitudinal section of a tenth embodiment of the ignition device according to the invention comprising an MID support.

The ignition device illustrated in FIG. 10 has, in contrast to the ignition device illustrated in FIG. 9, an ignition cap 5 whose connecting wires 13 are connected with a metallized area of the MID support. A heat conducting device 3 in the form of a metallic pin extends from a connecting wire 13 with which its pin is in contact, into the proximity of the rearward end of the MID support.

Figure 11:
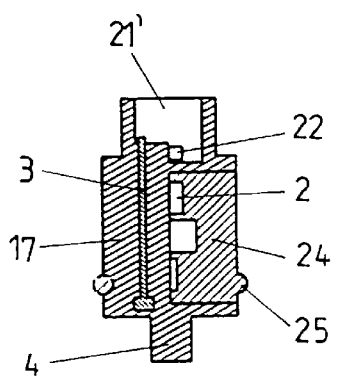
FIG. 11 is a schematic longitudinal section of an eleventh embodiment of the ignition device according to the invention comprising an MID support.
Figure 18:
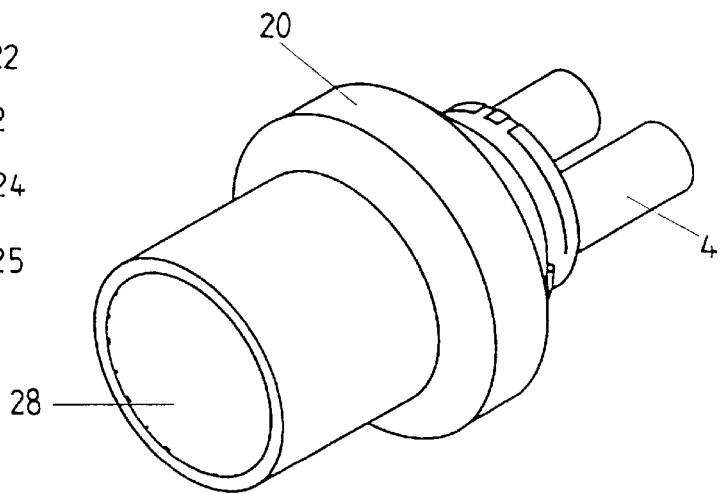
FIG. 18 hows the completed state of the embodiment of FIGS. 12–15 in a perspective view.
Figure 16:
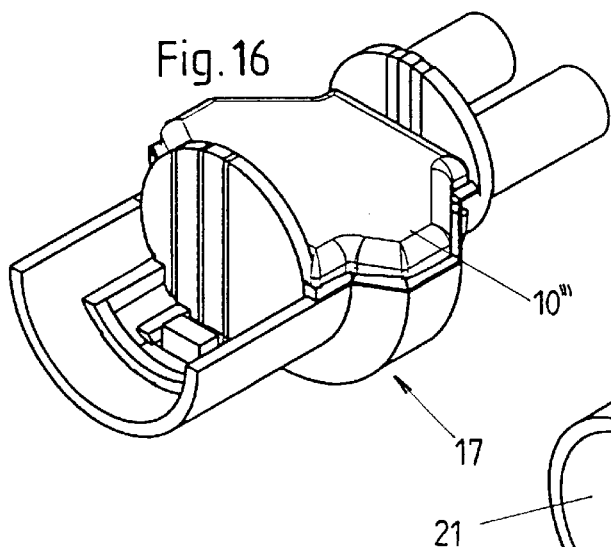
FIG. 16 shows a further completion step of the embodiment of the ignition device according to FIGS. 12–15 in a perspective view.
Figure 17:
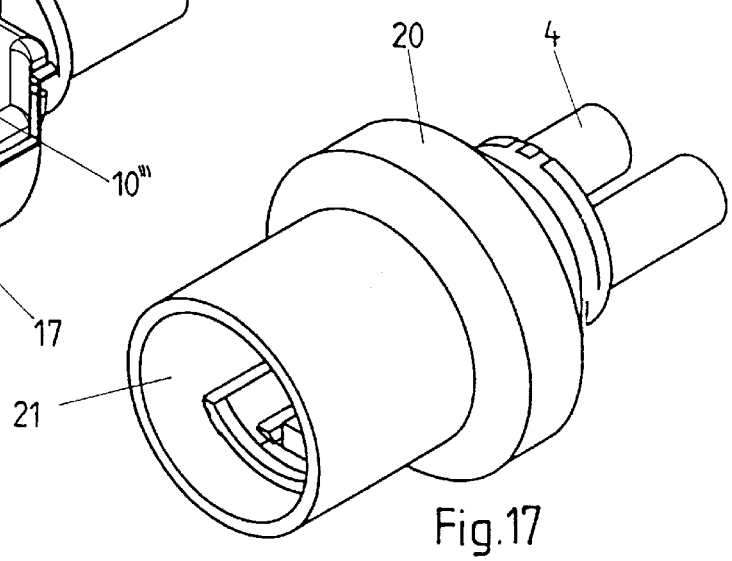
FIG. 17 shows the embodiment of FIGS. 12–15 in a farther completed state in a perspective view.
Figure 14:
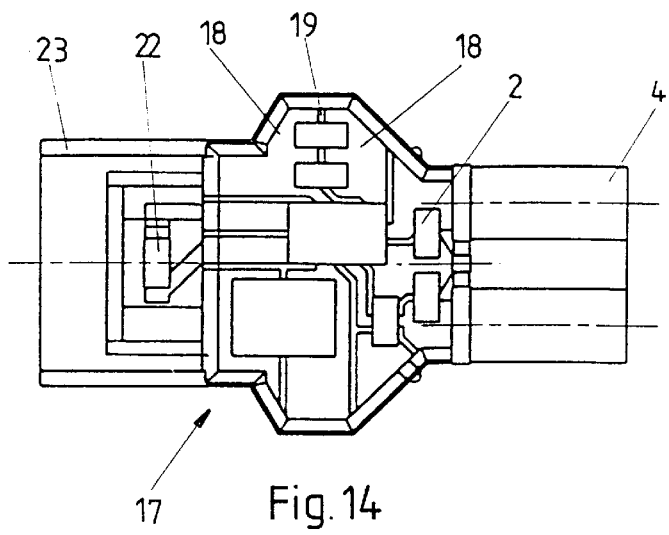
FIG. 14 is a plan view of the embodiment of the ignition device according to FIG. 12.
Figure 15:
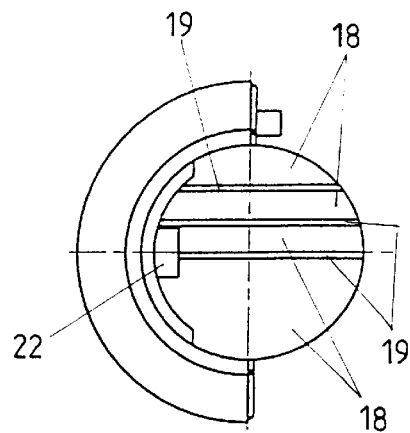
FIG. 15 is a front view of the embodiment of the ignition device according to FIG. 12.
Figure 12:
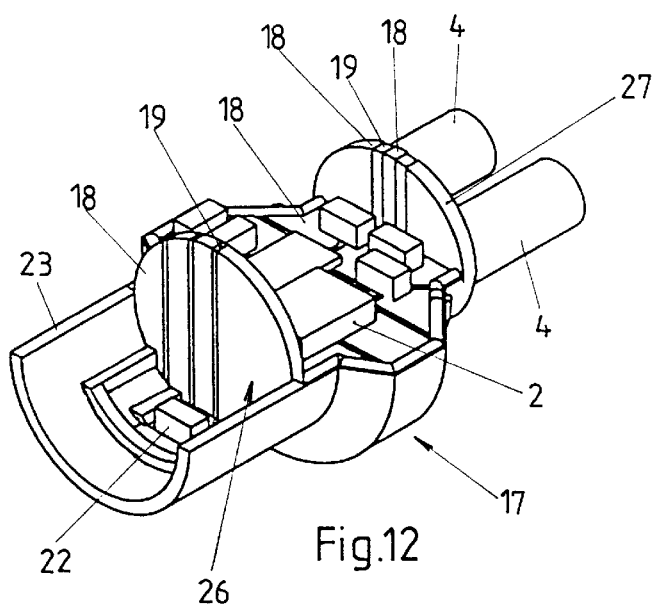
FIG. 12 is a perspective illustration from above of a further embodiment of the ignition device according to the invention comprising an MID support, the device being shown in a partially completed state.
Figure 13:
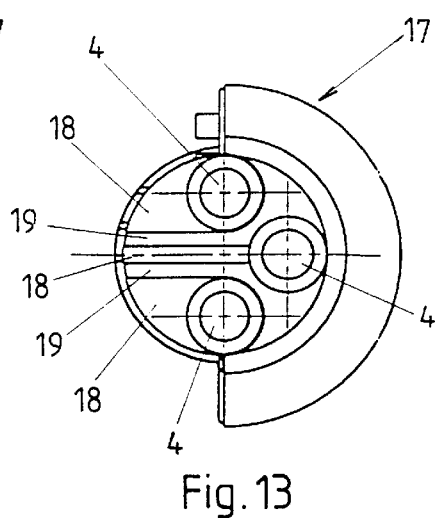
FIG. 13 is a rearview of the embodiment of the ignition device according to FIG. 12.

The support illustrated in FIG. 11 has a powder chamber 21' whose lateral and rearward walls are completely formed by the MID support. The forward end of a heat conducting device 3 in the form of a metal pin extends into this powder chamber 21'. A soft plastic material component 24 is injection-molded onto the MID support. This soft plastic material component 24 forms an annular bead 25 surrounding the exterior side of the ignition device and forming a seal when the ignition device is inserted into a cylindrical socket of a drive device of a restraining device of a motor vehicle. Since such a soft plastic material component can be applied by a low-pressure injection molding process, a previously performed sealing of the electronic components 2 by a sealing compound can be omitted.

In the embodiment illustrated in FIGS. 12 to 18, the MID support is provided with a large surface area metallization. The term large surface area metallization is meant in the context of the invention such that the electroplated metallized areas 18 occupy a significantly greater surface area on the surface of the MID support than the intermediately positioned insulating areas 19. Preferably, more than 80% of the surface of the upper side of the MID support are covered by such a large surface area metallization. These large surface area metallized portions have a high heat conductivity and form in their entirety a heat conducting device which extends from the rearward area of the ignition device into the powder chamber or to the connecting wires of an ignition cap.

It is especially favorable when a metallized area, which extends continuously from the rearward area of the ignition device into the powder chamber or to a connecting wire of an ignition cap, is used as a heat conducting device or part of the heat conducting device (not illustrated in FIGS. 12 to 18). Such a continuous area should not be provided without insulation at the exterior side of the finish-manufactured ignition device in order not to lead to the danger of ignition misfires of the ignition device. When this continuously metallized area extends to the backside of the back wall 27 of the MID support, this back wall is advantageously also embedded by injection molding at its rearward side by the further plastic component 20 so that the metallization is covered by a thin layer of this plastic material component. This continuous area of the metallization can also at least partially extend at the side surface or bottom surface of the MID support wherein these areas as a consequence are also embedded by injection molding with the further plastic material component 20.

In the embodiment according to FIGS. 12 to 18, the back wall 26 of the powder chamber 21, formed by the MID support, is provided at its side facing the powder chamber 21 also with a large surface area metallization. Since plastic material can take up moisture and release it outwardly by diffusion, such an outward diffusion however being prevented by an electroplated layer, a protection of the powder chamber against diffusion of moisture from the rearward end of the ignition device into the powder chamber is achieved. As a further protection against the diffusion of moisture in the longitudinal direction of the ignition device, the back wall 27 of the ignition device, where the connector pins 4 are arranged, is also provided with a large surface metallization at least at their inner side and/or outer side.

The construction and manufacture of the ignition device as illustrated in FIGS. 12 to 18 correspond substantially to the embodiment illustrated in FIG. 9. After injection molding, the metallization by electroplating, and the mounting of the electronic components on the MID support, the electronic components 2 are embedded in a sealing compound 10''' and, subsequently, the MID support and the sealing compound are embedded by injection molding in the further plastic material 20. The powder chamber 21 is filled with powder and closed at its front side with a membrane 28. A heat conducting device 3 in the form of a metal pin, as is illustrated in FIG. 9, can be provided in the embodiment of FIGS. 12 to 18 in addition to the large surface area metallization realizing the heat conducting device.

In addition or instead of the heat conducting element, in all illustrated embodiments pyrotechnical elements could be also provided as energy transfer devices. They could be formed by a match cable or by a chamber filled with pyrotechnical material which extends from the rearward area of the ignition device to the area of the ignitor, respectively. An ignitable powder but also a hardenable liquid pyrotechnical material can be used as a pyrotechnical material.

While specific embodiments of the invention have been shown and described in detail to illustrate the inventive principles, it will be understood that the invention may be embodied otherwise without departing from such principles.

What is claimed is:

1. An ignition device for triggering a restraining device of a motor vehicle, the ignition device comprising:
   an ignition device member having a forward end and a rearward end and having an insulated exterior with an exterior surface;
   an ignitor arranged at the forward end of the ignition device member;
   electronic components for triggering ignition of the ignitor;
   at least one connector pin arranged on the ignition device member for electrically contacting the electronic components;
   an energy transfer device, being a part separate from the at least one connector pin and extending from the rearward end of the ignition device member to the ignitor, wherein the energy transfer device is configured to trigger the ignitor when the rearward end is exposed to heat;
   wherein the energy transfer device is entirely arranged within an interior of the ignition device member and is electrically insulated from surroundings of the ignition device member but is located in the area of the rearward end in close proximity to the exterior surface of the ignition device member.

2. The ignition device according to claim 1, wherein the ignition device member comprises an ignition device housing or an ignition device body.

3. The ignition device according to claim 1, wherein the ignitor is an ignition cap or an ignition resistor.

4. The ignition device according to claim 1, wherein the energy transfer device is located closer than 1 mm to the exterior surface of the ignition device member.

5. The ignition device according to claim 1, wherein the energy transfer device is a heat conducting device.

6. The ignition device according to claim 1, wherein the energy transfer device is a pyrotechnical element.

7. The ignition device according to claim 6, wherein the pyrotechnical element is selected from the group consisting of a match cord or a chamber filled with pyrotechnical material.

8. The ignition device according to claim 1, wherein the energy transfer device contacts a part of the ignitor.

9. The ignition device according to claim 8, wherein the ignitor is an ignition resistor comprising a connecting wire, wherein the energy transfer device contacts the connecting wire.

10. The ignition device according to claim 8, wherein the ignitor is a chamber filled with pyrotechnical material, wherein the energy transfer device projects into the chamber.

11. The ignition device according to claim 8, wherein the ignitor is an ignition cap, wherein the energy transfer device contacts the ignition cap.

12. The ignition device according to claim 1, wherein the energy transfer device is a heat conducting device formed by a metal pin.

13. The ignition device according to claim 1, comprising an MID support and electronic components arranged on the MID support, wherein the MID support has metallized areas and wherein at least some of the metallized areas form strip conductors electrically connecting the electronic components, wherein the energy transfer device is a heat conducting device and wherein the heat conducting device is at least partially formed by one of the metallized areas.

14. The ignition device according to claim 13, wherein the heat conducting device is formed by a continuous portion of the metallized areas, wherein the ignitor is selected from the group consisting of a chamber filled with pyrotechnical material, an ignition resistor with a connecting wire, and an ignition cap with a connecting wire, wherein the continuous portion extends from the rearward end into the chamber filled with pyrotechnical material or contacts the connecting wire of the ignition resistor or of the ignition cap.

15. The ignition device according to claim 13, wherein a surface area of the metallized areas is significantly larger than an insulating area between the metallized areas.

16. The ignition device according to claim 13, wherein the MID support comprises at least one connector pin at a rearward end of the MID support located at the rearward end of the ignition device member, wherein the at least one connector pin is a unitary part of the MID support and is metallized.

17. The ignition device according to claim 13, wherein the ignitor is a chamber filled with pyrotechnical material, wherein the MID support forms a rear wall of the chamber filled with pyrotechnical material, wherein at least one of a first surface of the MID support facing the chamber filled with pyrotechnical material and a second surface of the MID support facing away from the chamber filled with pyrotechnical material is provided with the metallized areas over a preponderant portion of the surface area of the at least one of the first and second surfaces.

18. The ignition device according to claim 17, wherein the rear wall is disk-shaped and wherein the at least one of the first and second areas is provided with metallized areas over more than 80% of the surface area.

19. The ignition device according to claim 13, wherein the metallized areas are electro-plated onto the MID support.

* * * * *